(12) United States Patent
Thaxton

(10) Patent No.: US 6,210,737 B1
(45) Date of Patent: Apr. 3, 2001

(54) PROCESS OF BEVERAGE PREPARATION

(76) Inventor: Eric Thaxton, 13205 Rutherford Rd., Yakima, WA (US) 98903

( * ) Notice: Subject to any disclaimer, the term of this patent is extended or adjusted under 35 U.S.C. 154(b) by 0 days.

(21) Appl. No.: 09/310,454

(22) Filed: May 12, 1999

(51) Int. Cl.[7] .................................................. A23L 2/60
(52) U.S. Cl. ................................ 426/590; 426/477
(58) Field of Search ......................... 426/590, 477

(56) References Cited

U.S. PATENT DOCUMENTS

| | | | |
|---|---|---|---|
| 5,068,116 | 11/1991 | Gibney | 426/231 |
| 5,072,853 | 12/1991 | Shannon | 222/1 |
| 5,303,846 | 4/1994 | Shannon | 222/54 |
| 5,314,703 | 5/1994 | Gibney | 426/231 |
| 5,537,914 | 7/1996 | Gibney | 99/323.2 |
| 5,552,171 | 9/1996 | Gibney | 426/231 |
| 5,656,313 | 8/1997 | Gibney | 426/231 |
| 5,919,512 | * 7/1999 | Montezinos | 426/590 |

* cited by examiner

*Primary Examiner*—Helen Pratt
(74) *Attorney, Agent, or Firm*—Liebler, Ivey & Connor; Floyd E. Ivey (57) ABSTRACT

A process for improving beverage quality and increasing syrup yield within a beverage proportioning system. After reducing the alkalinity of the water and determining the acidity of the finished syrup component, sugar is added to the finished syrup in a quantity sufficient to bring the syrup within the brix and acidity parameters of the syrup. The method increases the brix value of the syrup, which allows for a high syrup yield and a high quality final beverage. To ensure a high syrup yield, the water flow to be mixed with the finished syrup is determined as a function of the brix of the finished syrup as compared to preset parameters of the beverage.

28 Claims, 8 Drawing Sheets

PROCESS OF BEVERAGE PREPARATION

FIELD OF THE INVENTION

The present invention relates generally to a method for improving beverage quality and increasing syrup yields within a beverage preparation system. In particular, the invention relates to a method of reducing the acidity of the finished syrup component of a beverage system by the addition of sugar to the finished syrup. Increased syrup yields are obtained by determining the water flow rate as a function of the brix of the finished syrup component as compared to preset parameters of the beverage and adjusting the water flow accordingly.

BACKGROUND OF THE INVENTION

In a beverage proportioning system, the production process typically begins by the generation of a finished syrup. A bottler combines specified amounts of sugar, water, concentrate, and other ingredients. This blend is called the finished syrup. Simple syrup refers to the solution of sugar dissolved in water. The sugar employed may be high fructose corn syrup, sucrose, or some other mixture. The finished syrup is then mixed with water and carbon dioxide. Bottles and cans are then filled with the finished beverage.

The proportioning standards of the ingredients are set by the recipe owner. A major goal of a bottler is to attain a high syrup yield and a final product within these standards. Because producing the syrup is a time consuming process and the concentrate is very expensive, the bottler attempts to maximize the amount of final beverage obtained from the finished syrup.

A typical problem encountered by most bottlers is water of high alkalinity. High alkalinity water adversely affects the flavor of the beverage. High alkalinity water neutralizes the acidity of the beverage resulting in a conditions conducive to microorganism growth. This is due in part to the fact that the preservative benzoic acid requires a low pH to be effective. As a result, water of high alkalinity means a shorter shelf life for the beverage.

Bottlers employ various methods to reduce the alkalinity of the water. A common method is to add hydrated lime $(Ca(OH)_2)$ to the water to precipitate the bicarbonates. This process reduces the alkalinity of the water. However, once the low alkalinity water is combined with the concentrate, sugar, and other acids to form the finished syrup component, the resulting finished syrup may be too acidic. Besides the poor taste, a beverage of high acidity is undesirable because it causes boiling at the filler thereby resulting in slower speeds at the filler.

In existing systems, if the acidity of the finished syrup is too high, water is added to the finished syrup to dilute the acid within the desired acidity range. Because diluting the finished syrup results in a syrup of lower brix (concentration in percent of sugar by weight according to the brix scale), the syrup yield is thereby decreased as well. That is, a smaller quantity final beverage is obtained from the syrup because the sugar concentration of the syrup is diluted. Furthermore, the dilution of the finished syrup also decreases the concentration of the caffeine, benzoate, and other flavoring acids (e.g., citric, tartaric, or malic acid) thereby resulting in a lower quality drink. The bottler may then be required to add more caffeine, benzoate, and other flavoring acids to attain a beverage within the parameters for these ingredients. All this is of substantial cost to the bottler.

The problem is compounded by the fact that bottlers typically employ a trial and error technique for adjusting the water flow to be blended with the finished syrup. That is, bottlers typically apply one preset standard for the water flow and other components. Any adjustment of the water flow is made on a trial and error basis to bring the beverage within the brix parameters. If the blended beverage falls outside the standards, the batch is disposed of at substantial cost to the bottler.

U.S. Pat. Nos. 5,068,116, 5,314,703, 5,537,914, 5,552,171, 5,656,313, to Gibney et al. disclose a method of beverage blending. The method comprises, inter alia, determining the brix value of the blended water and syrup according to a formula, comparing this value to a preset target value, and then adjusting the blend of the water and syrup by the apparatus to approach the target value. U.S. Pat. No. 5,072,853 to Shannon discloses a technique for setting the brix in a soft drink dispenser using electrical probes. The method comprises determine the amount of time required for the syrup to pass the distance from the syrup dispensing head to the second probe. This time is a function of the flow rate and brix and the flow rate is then adjusted accordingly. Likewise, U.S. Pat. No. 5,303,846 to Shannon discloses a method of determining the brix of the syrup as a function of the temperature of the syrup using thermal sensing means.

The foregoing patents and printed publications are provided herewith in an Information Disclosure Statement in accordance with 37 CFR 1.97.

SUMMARY OF THE INVENTION

It is a primary object of the present invention to provide a method of reducing the acidity of the finished syrup component of the beverage processing system without decreasing the syrup yield of the beverage.

A further object of the invention is to provide a method of increasing syrup yields within a beverage processing system, such increased yields obtained by a method that does not reduce the brix of the finished syrup upon reduction of the acidity of the syrup.

A further object of the invention is to provide a method of improving the quality of a beverage by increasing the beverage shelf life and improving the beverage taste, such high quality obtained by a method that does not reduce the strengths of the ingredients such as the caffeine, benzoate, and other acids upon reduction of the acidity of the syrup.

A further object of the invention is to provide a method for reducing the rapid loss of carbonation or boiling at the filler unit, such reduction obtained by a method that reduces the acidity of the finished syrup thereby resulting in an increase in filler speeds.

A further object of the invention is to provide a method of adjusting the water/syrup ratio which is accurate and reliable, substantially eliminating human error and ad hoc trial and error approaches, such method obtained by adjusting the water flow as a function of the brix of the finished syrup component to attain a beverage within the preset brix parameters.

In accordance with the teachings herein, the present invention discloses a process of beverage preparation that results in increased syrup yields and an improved beverage of high quality. The increased yields are obtained by reducing the alkalinity of the water component, preferably to twenty parts per million or less, followed by reducing the acidity of the finished syrup component by the addition of sugar to the finished syrup component to bring the acidity within the established parameters. The addition of sugar to the finished syrup component increases the brix of the syrup thereby allowing more water to be mixed with the finished syrup, resulting in a higher quantity of final beverage that can be obtained from the batch of syrup. The amount of water to be mixed with the finished syrup is determined as a function of the brix of the finished syrup component as compared to the parameters of the final beverage; the water flow rate is set accordingly to attain an increased yield of final beverage within the brix parameters. Because the acidity of the finished syrup is reduced, there is less boiling at the filler unit, thereby resulting in an increase in filler speeds.

The beverage quality is improved because the strengths of the ingredients such as the caffeine, benzoate, and other acids remain stable upon reduction of the acidity of the syrup. The final beverage has a longer shelf life because the preservative benzoate, which requires a low pH to be effective, is not diluted.

BRIEF DESCRIPTION OF THE DRAWINGS

The foregoing and other features and advantages of the present invention will become more readily appreciated as the same become better understood by reference to the following detailed description of the invention when taken in conjunction with the accompanying drawing, wherein.

DETAILED DESCRIPTION OF THE PREFERRED EMBODIMENT

Figure 1:
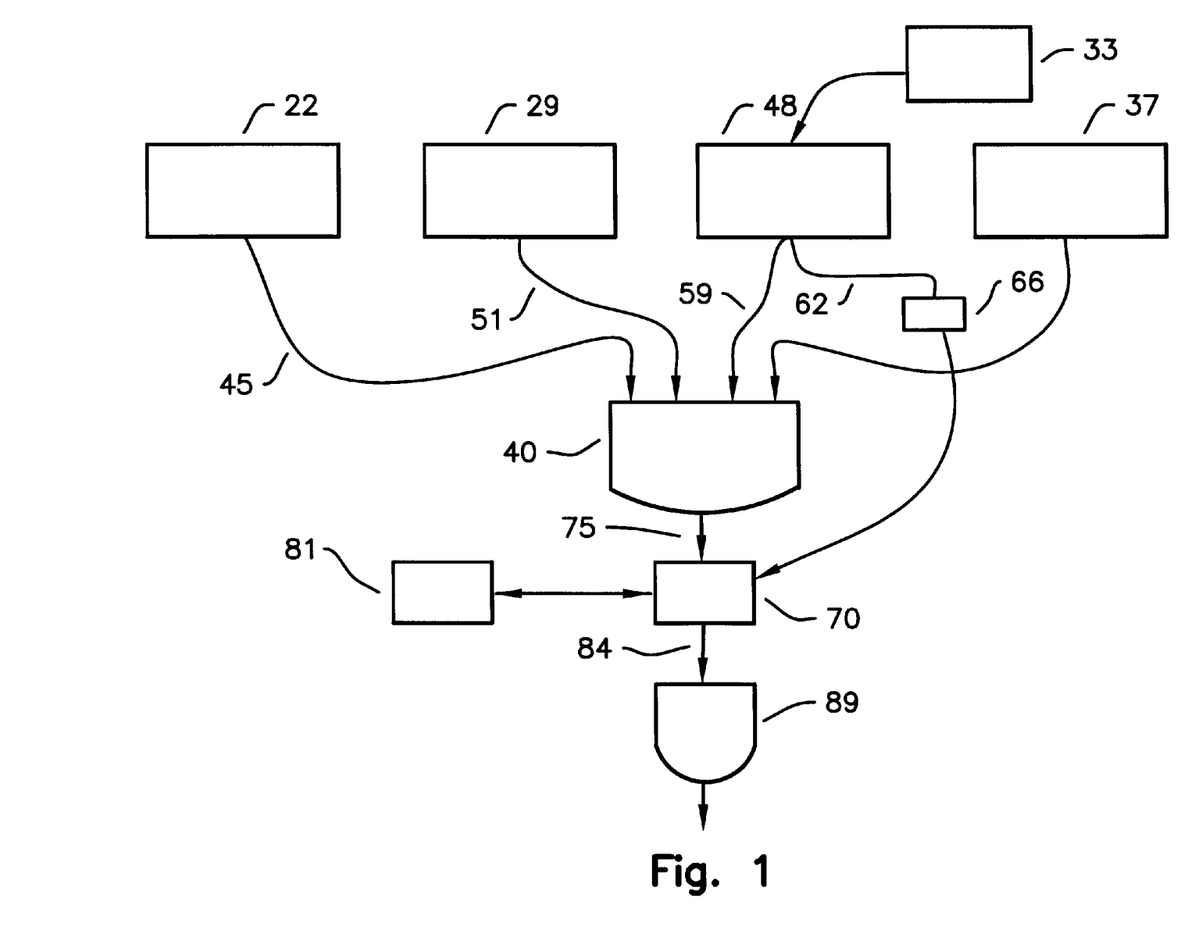
FIG. 1 is a schematic diagram of a beverage processing system.

FIG. 1 is a schematic diagram of a typical beverage processing system 10. A bottler generates the finished syrup 40 by combining concentrate 22, water 33, sugar 29 (typically sucrose or high fructose corn syrup), and other ingredients 37. These other ingredients 37 comprise acids (e.g., citric, tartaric, or malic acid), preservatives (e.g., benzoate), caffeine, and other components. These other ingredients 37 may be predissolved before mixing into the finished syrup 40. The concentrate 22 is obtained from the licensing company and the amount of each component used is set by the syrup recipe owner and the trademarks associated with the beverage.

The finished syrup 40 flows through syrup inlet 75 to a blender 70 where the finished syrup is mixed with water 33 and carbon dioxide 81. The water 33 flows to the mixer 70 through a second water inlet 62. The water flow through this inlet 62 is controlled by a micrometer control valve 66 which is set to obtain a final product within the standards mandated by the recipe owner. The blend is cooled to a temperature to minimize boiling or the rapid loss of carbonation at the filler unit 89. The resulting blend flows through the mixer inlet 84 to the filler unit 89 where cans or bottles are filled with the beverage. Further processing such as sealing and packaging then takes place to complete the process.

Bottlers employ various treatment methods 48 to purify and reduce the alkalinity of the water to ensure consistent taste and quality in the final beverage. A common method is to first add chlorine in the form of calcium hypochlorite or sodium hypochlorine to kill organisms such as bacteria, followed by the addition of a coagulant such as ferrous sulfate. Hydrated lime ($Ca(OH)_2$) is then added to the water 33 to precipitate the carbonates and reduce the alkalinity. The addition of calcium chloride may also be required. The water is then filtered and purified for use.

Figure 2:
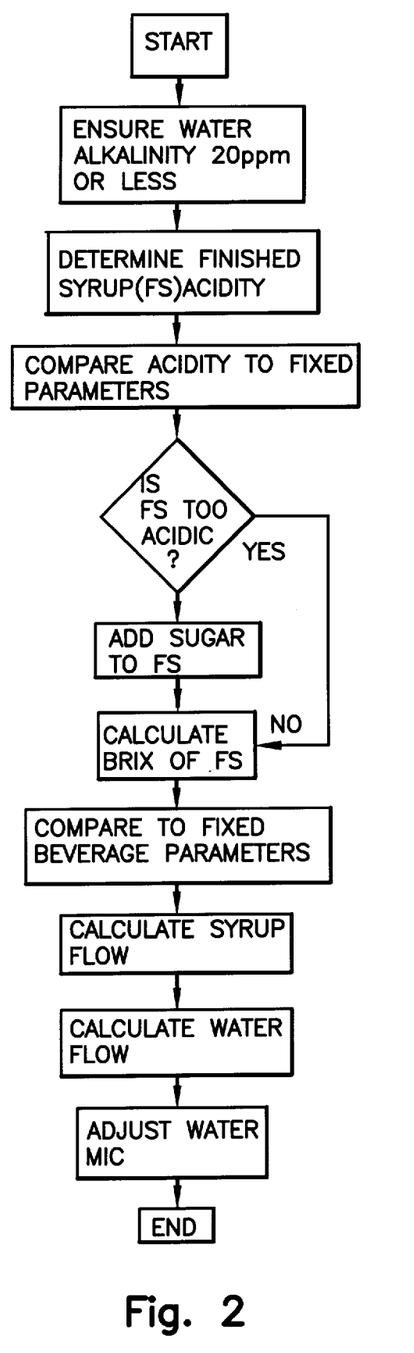
FIG. 2 is a flow chart of the preferred method of reducing the acidity of the finished syrup and obtaining increased syrup yields.

FIG. 2 is a flow chart of the preferred method of reducing the acidity of the finished syrup and obtaining increased syrup yields. As indicated in FIG. 2, to ensure high syrup yields and an improved taste, it is preferred that the water 33 comprise an alkalinity of not more than 20 parts per million. If alkalinity is high, the preferred method of accomplishing such a reduction is by reducing the chlorine and ferrous sulfate added to the water. Instead of adding large quantities of chlorine to attain water composed of 8–10% chlorine, it has been found that, with otherwise proper sanitation, water composed of about 3% chlorine brings about the desired results of a low bacterial count and a reduced alkalinity. Then, by adding accurate amounts of lime to the water, there is no lime build up and no boiling at the filler unit 89 from too much lime.

Once the low alkalinity water 33 is combined with the concentrate 22, sugar 29, and other ingredients 37 to form a finished syrup component 40, the finished syrup 40 is highly acidic.

To reduce the acidity of the finished syrup 40, increase syrup yields, and improve beverage quality, the method of the present invention comprises determining the acidity of the finished syrup, comparing the acidity to preset parameters of the syrup 40, and if the acidity is too high, adding sugar to the finished syrup 40 in a quantity sufficient to reduce the acidity finished syrup to within the preset parameters. The preset parameters may be the brix or total acidity (TA) standards for the syrup 40. Determination of the acidity can be done using any number of common methods including titration. Because the acidity of the syrup 40 is reduced, there is less rapid loss of carbonation or boiling at the filler unit 89, and filler speeds can thereby be increased. The method is not limited to a particular sugar; for example, high fructose corn syrup and sucrose will achieve the desired results. High fructose corn syrup composed of a brix in the range of 76.5–77.4 has been found to be the preferred sugar. It is believed that the acidity of the syrup 40 is reduced by a hydrolysis reaction between the sugar and the acids. For example, when a disaccharide such as sucrose ($C_{12}H_{22}O_{11}$) is combined with an acid, the acid hydrolyzes the disaccharide to two monosaccharides, glucose and fructose (both $C_6H_{12}O_6$). The following table contains experimental results (in volumetric ratios) for 10 beverages illustrating the relationship between the amount of sugar (preferably high fructose corn syrup comprising 76.5–15 77.4 brix) added to the finished syrup to reduce the acidity of the finished syrup of a number of beverages denoted by their brix and total acidity (TA) parameters.

| FINAL BEVERAGE | RATIO OF SUGAR ADDED PER QUANTITY OF CONCEN-TRATE | FINAL BEVERAGE | RATIO OF SUGAR ADDED PER QUANTITY OF CONCEN-TRATE |
|---|---|---|---|
| BRIX 10.5–10.8 TA 17.3–19.0 | 1.33–1.67 | BRIX 11.4–12.4 TA 28.2–32.2 | 0.4–0.8 |
| BRIX 10.0–10.4 TA 24.5–26.5 | 3.5 | BRIX 13.6–14.0 TA 36.8–39.4 | 0.875 |
| BRIX 10.4–10.8 TA 8.5–9.5 | 0.67–1.5 | BRIX 12.4–12.8 TA 20.0–23.0 | 0.47–0.53 0.5–1 |

-continued

| FINAL BEVERAGE | RATIO OF SUGAR ADDED PER QUANTITY OF CONCENTRATE | FINAL BEVERAGE | RATIO OF SUGAR ADDED PER QUANTITY OF CONCENTRATE |
|---|---|---|---|
| BRIX 11.1–11.5 TA 11.5–13.5 | 0.6–1 | BRIX 10.4–10.8 TA 19.3–21.0 | 2.67–4 4.67–7 |
| BRIX 11.5–11.9 TA 5.3–6.9 | 1.25 | BRIX 10.6–11.0 TA 26.3–28.5 | 0.875 |

Adding sugar to the finished syrup 40 increases the brix of the syrup 40, thereby allowing more water 33 to be mixed with the finished syrup 40 at the blender 70, and increased syrup yields as a higher quantity of final beverage can be obtained from the batch of syrup 40. As further shown in FIG. 2, once the acidity of the finished syrup 40 is reduced, the water flow 33 through inlet 62 must then be determined. The water flow 33 to be combined with the finished syrup 40 is determined as a function of the brix of the finished syrup 40 as compared to preset parameters of the final beverage. The preset parameters may be the brix and total acidity (TA) parameters of the final beverage. The brix of the finished syrup 40 can be determined by refractometer or brix hydrometer methods. Using tables, the sugar concentration can then be obtained from the refractive index of the syrup 40. This is compared to the fixed parameters of the final beverage.

To adjust the water flow 62 to obtain increased syrup yields, the micrometer control valve 55 is adjusted based upon the sugar concentration or brix of the finished syrup 40 as compared to the brix and TA parameters of the final beverage. FIGS. 3–13 are plots of sugar concentration (FS Brix) versus water flow micrometer 66 settings (Water FLOW) for a number of beverages denoted by their brix and TA parameters. The water flow settings 66 were found to be the preferred setting for the corresponding finished syrup 40 sugar concentration (brix) to attain a maximum syrup yield of beverage within the preset standards. The table below contains the data points for each plot and the formula which represents the points for the optimum water flow settings 66 corresponding to the finished syrup sugar concentration. Again, each beverage is denoted in terms of its brix and TA parameters.

Figure 3:
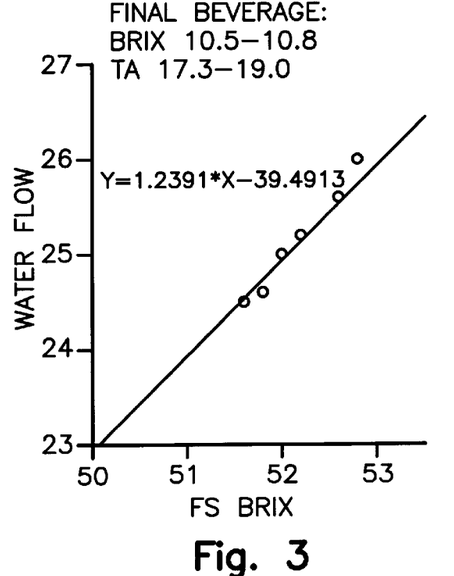
FIGS. 3–13 are plots of the finished syrup concentration (FS BRIX) versus water flow setting (WATER FLOW) for a number of beverages of various brix and TA parameters. The data points have been determined to be the optimum water flow settings (WATER FLOW) for the corresponding finished syrup concentration (FS BRIX) that result in increased syrup yields and improved quality beverage for the beverages which are denoted by their brix and total acidity (TA) parameters. Also shown on each plot is the formula represented by said data points.
Figure 4:
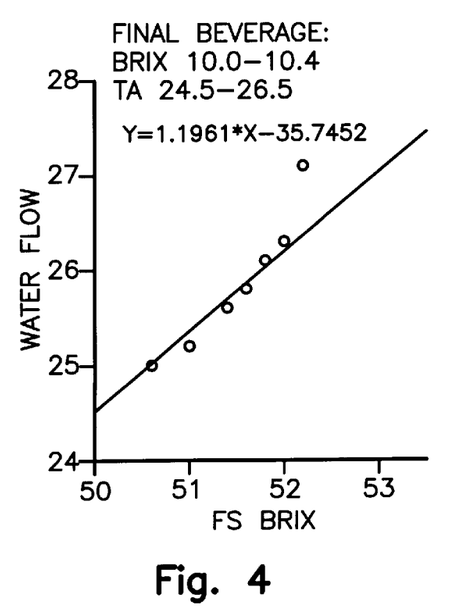
Figure 5:
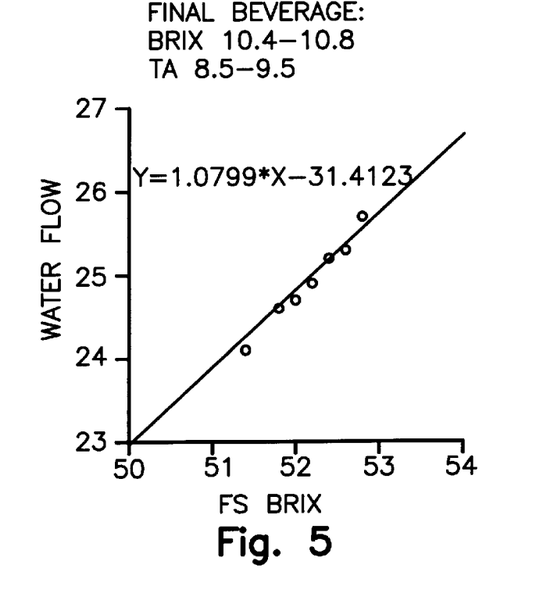
Figure 6:
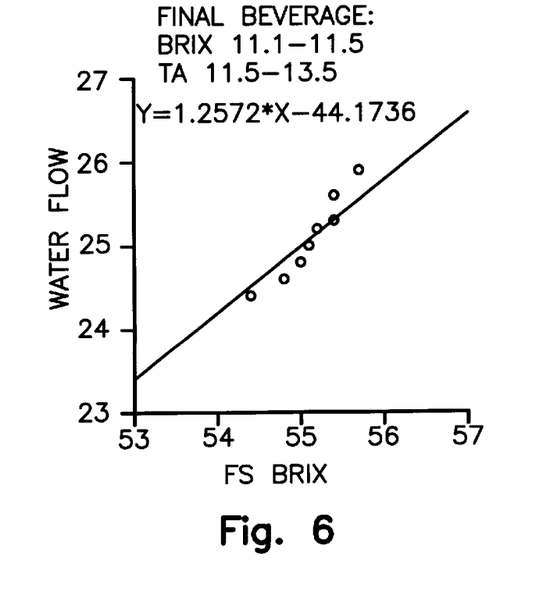
Figure 7:
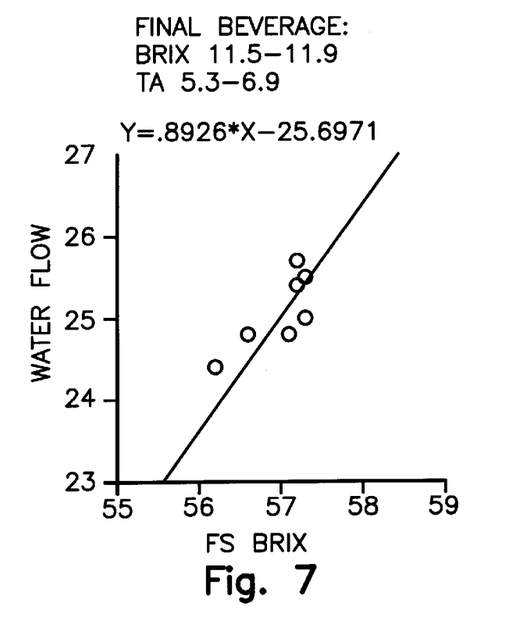
Figure 8:
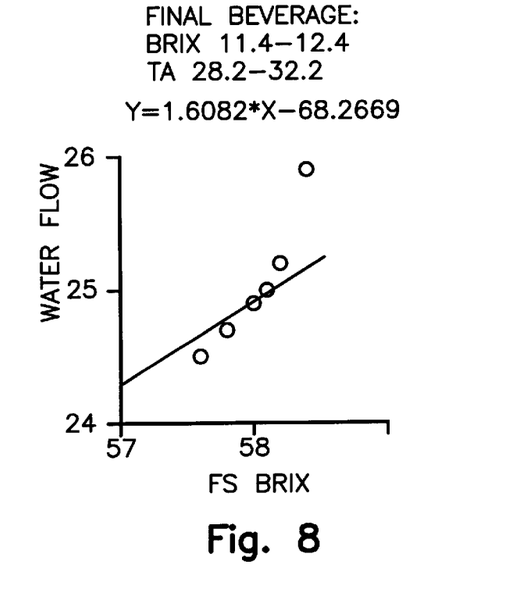
Figure 9:
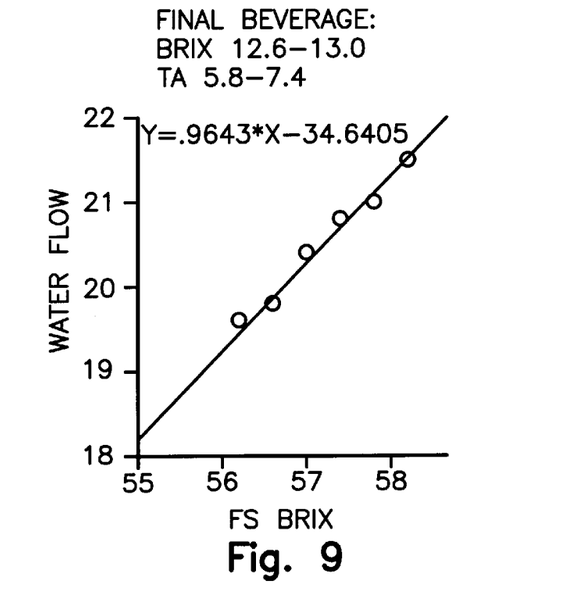
Figure 10:
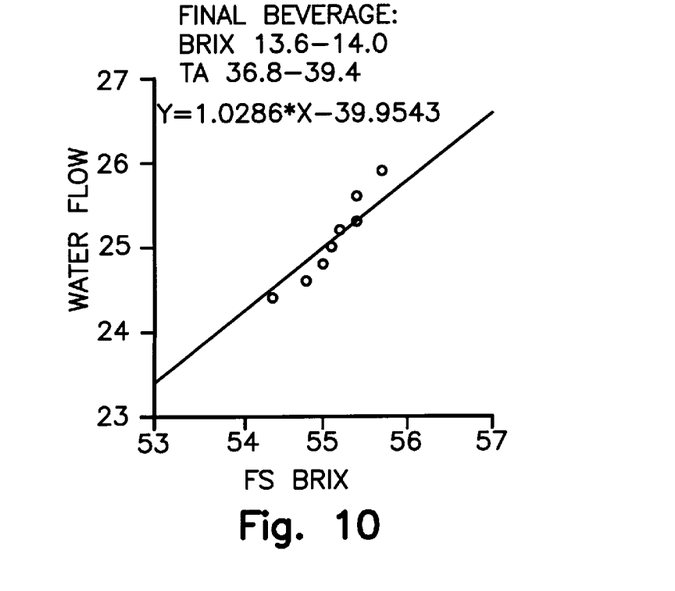
Figure 11:
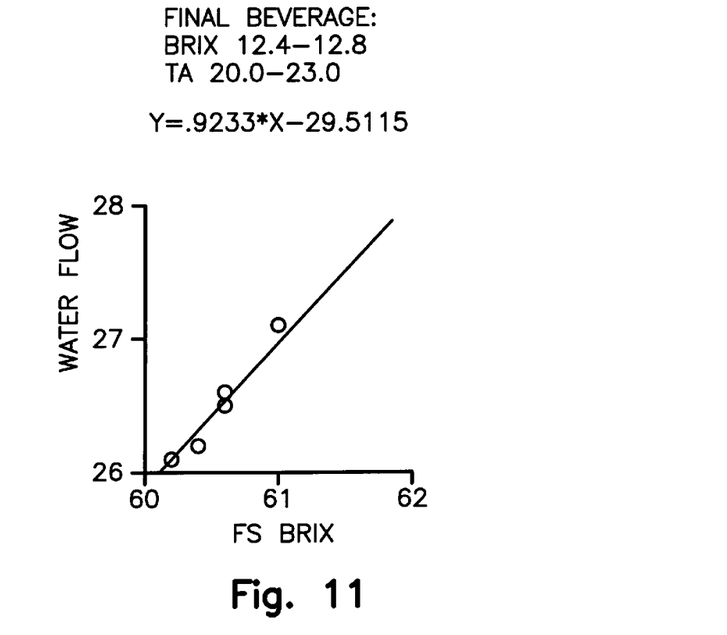
Figure 12:
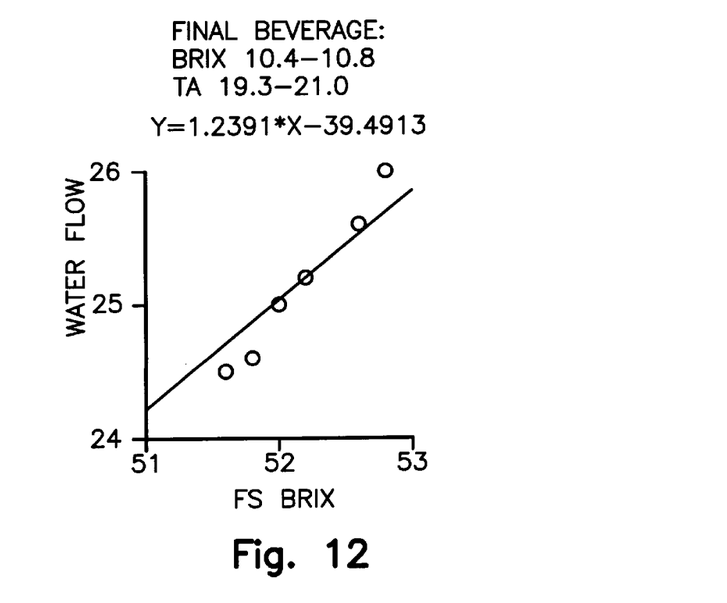
Figure 13:
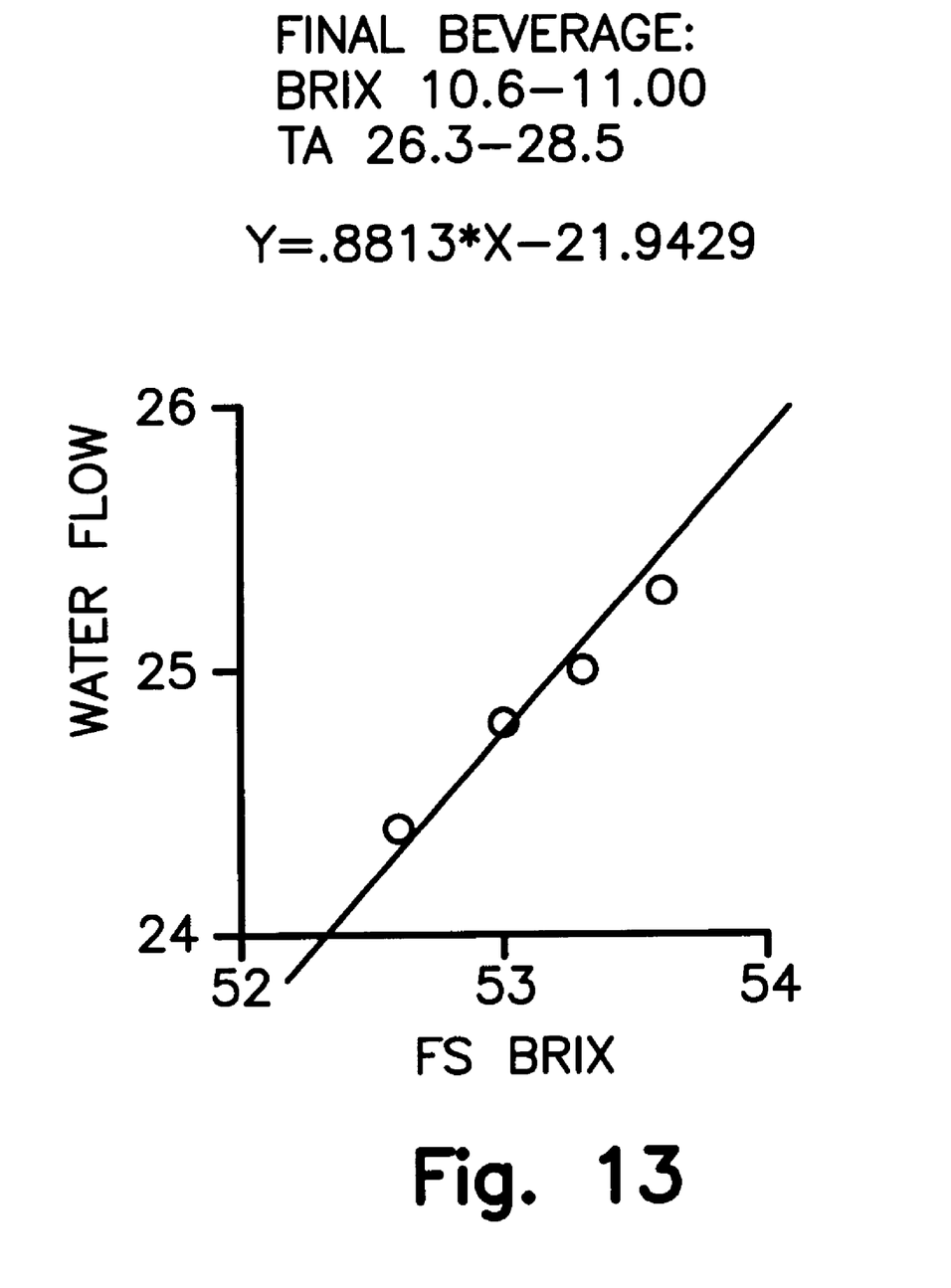

| FINAL BEVERAGE | DATA POINTS (FS BRIX, WATER FLOW) WATER FLOW = GAL/MIN | FORMULA X = FS BRIX Y = WATER FLOW (GAL/MIN) | PLOT |
|---|---|---|---|
| BRIX 10.5–10.8 TA 17.3–19.0 | (51.6, 24.5), (51.8, 24.6), (52.0, 25.0), (52.2, 25.2), (52.6, 25.6), (52.8, 26.0) | $Y = 1.2391X - 39.4913$ | FIG. 3 |
| BRIX 10.0–10.4 TA 24.5–26.5 | (50.6, 25.0), (51.0, 25.2), (51.4, 25.6), (51.6, 25.8), (51.8, 26.1), (52.0, 26.3), (52.2, 27.1) | $Y = 1.1961X - 35.7452$ | FIG. 4 |
| BRIX 10.0–10.8 TA 8.5–9.5 | (51.4, 24.1), (51.8, 24.6), (52.0, 24.7), (52.2, 24.9), (52.4, 25.2), (52.6, 25.3), (52.8, 25.7) | $Y = 1.0799X - 31.4123$ | FIG. 5 |
| BRIX 11.1–11.5 TA 11.5–13.5 | (55.7, 25.9), (55.4, 25.6), (55.3, 25.4), (55.2, 25.2), (55.1, 25.0), (55.0, 24.8), (54.8, 24.6), (54.4, 24.4) | $Y = 1.2572X - 44.1736$ | FIG. 6 |
| BRIX 11.5–11.9 TA 5.3–6.9 | (56.2, 24.4), (56.8, 25.1), (56.6, 24.8), (57.2, 25.4), (57.3, 25.0), (57.3, 25.5), (57.2, 25.7) | $Y = 0.8926X - 25.6971$ | FIG. 7 |
| BRIX 11.4–12.4 TA 28.2–32.2 | (58.1, 25.0), (58.2, 25.2), (58.4, 25.9), (57.8, 24.7), (57.6, 24.4), (58.0, 24.9) | $Y = 1.6082X - 68.2669$ | FIG. 8 |
| BRIX 12.6–13.0 TA 5.8–7.4 | (56.6, 19.8), (56.2, 19.6), (57.0, 20.4), (57.4, 20.8), (57.8, 21.0), (58.2, 21.5) | $Y = 0.9643X - 34.6405$ | FIG. 9 |
| BRIX 13.6–14.0 TA 36.8–39.4 | (56.0, 17.6), (56.2, 18.0), (56.6, 18.2), (55.8, 17.4) | $Y = 1.0286X - 39.9543$ | FIG. 10 |
| BRIX 12.4–12.8 TA 20.0–23.0 | (60.2, 26.1), (60.4, 26.2), (60.6, 26.5), (60.8, 26.6), (61.0, 26.7), (61.1, 27.1) | $Y = 0.9233X - 29.5115$ | FIG. 11 |
| BRIX 10.4–10.8 TA 19.3–21.0 | (51.6, 24.5), (51.8, 24.6), (52.0, 25.0), (52.2, 25.2), (52.6, 25.6), (52.8, 26.0) | $Y = 1.2391X - 39.4913$ | FIG. 12 |
| BRIX 10.6–11.0 TA 26.3–28.5 | (52.6, 24.4), (53.0, 24.8), (53.3, 25.0), (53.6, 25.3) | $Y = 0.8813X - 21.9429$ | FIG. 13 |

The following table sets forth the corresponding regression values for the formula representing each of the corresponding plots of data points above wherein CONST is the Y-intercept, STD ERR OF Y EST is the degree of deviation between the observed y values and the predicted values, R SQUARED is the variance or the degree of relationship between the independent and dependent variables, X COEF is the slope of the formula, and STD ERR OF COEF represents the estimated error of said X COEF.

| FINAL BEVERAGE | CONST | STD ERR OF Y EST | R SQUARED | X COEF | STD ERR OF COEF | PLOT |
|---|---|---|---|---|---|---|
| BRIX 10.5–10.8 TA 17.3–19.0 | −39.4913 | 0.0821 | 0.9839 | 1.2391 | 0.0792 | FIG. 3 |
| BRIX 10.0–10.4 TA 24.5–26.5 | −35.7452 | 0.2465 | 0.8999 | 1.1961 | 0.1784 | FIG. 4 |
| BRIX 10.4–10.8 TA 8.5–9.5 | −31.4123 | 0.0752 | 0.9829 | 1.0799 | 0.0636 | FIG. 5 |
| BRIX 11.1–11.5 TA 11.5–13.5 | −44.1736 | 0.1342 | 0.9409 | 1.2572 | 0.1286 | FIG. 6 |
| BRIX 11.5–11.9 TA 5.3–6.9 | −25.6971 | 0.2593 | 0.7185 | 0.8926 | 0.2498 | FIG. 7 |
| BRIX 11.4–12.4 TA 28.2–32.2 | −68.2669 | 0.1853 | 0.8849 | 1.6082 | 0.2899 | FIG. 8 |
| BRIX 12.6–13.0 TA 5.8–7.4 | −34.6405 | 0.1058 | 0.9831 | 0.9643 | 0.0632 | FIG. 9 |
| BRIX 13.6–14.0 TA 36.8–39.4 | −39.9543 | 0.1219 | 0.9257 | 1.0286 | 0.2060 | FIG. 10 |
| BRIX 12.4–12.8 TA 20.0–23.0 | −29.5115 | 0.0862 | 0.9457 | 0.9233 | 0.1106 | FIG. 11 |
| BRIX 10.4–10.8 TA 19.3–21.0 | −39.4913 | 0.0821 | 0.9839 | 1.2391 | 0.0792 | FIG. 12 |
| BRIX 10.6–11.0 TA 26.3–28.5 | −21.9429 | 0.0337 | 0.9947 | 0.8813 | 0.0457 | FIG. 13 |

Because the acidity of the syrup 40 is reduced, there is less rapid loss of carbonation or boiling at the filler unit 89, and filler speeds can thereby be increased.

Application of the invention to any particular facility may further require adaption to the plant idiosyncracies to obtain the improved yields and quality. For example, some facilities may not be designed to completely drain themselves. After washing, the system may contain pockets of water, as for example, in the pipe from the blender 70 to the filler unit 89. To compensate for this excess water, the present invention contemplates closing the water micrometer valve 66 a certain amount for a time period after starting the run. This decrease in water prevents over-dilution of the beverage. In particular it has been found that accurate brix and carbon dioxide levels are obtained by reducing the carbonation a full four points (points refers to the handsetting on a particular carbon dioxide probe) and closing the micrometer 66 one full turn, for the initial twenty five percent of the drink run. This solves the problem of inaccurate carbon dioxide and brix levels in about the first ten cases of beverage.

The present invention further contemplates an improved beverage quality. The sweetness taste is prolonged because of the "inverted" hydrolysis products of the reaction between the sugar and the acids in the finished syrup. See Jasper Guy Woodroof and G. Frank Phillips, *Beverages: Carbonated and Noncarbonated*, 101 ($_2$nd ed. 1981). The beverage quality is further improved because the strengths of the ingredients 37 such as the caffeine, benzoate, and other acids are not diluted significantly upon reduction of the acidity of the syrup 40. The final beverage has a longer shelf life because the preservative benzoate, which requires a low pH to be effective, is not diluted. Because these ingredients 37 are not diluted, the bottler does not have to add more of these ingredients 37, thereby resulting in substantial cost savings for the bottler.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A method of reducing the acidity of the finished syrup component in a beverage processing system producing a beverage, comprising the steps of:
   A. providing a quantity of finished syrup comprising concentrate, sugar, and water;
   B. determining the acidity of the finished syrup;
   C. comparing the acidity value to a plurality of preset parameters for the syrup;
   D. adding sugar to the finished syrup to reduce said acidity to within said parameters.

2. The method of claim 1 wherein the sugar is a disaccharide.

3. The method of claim 1 wherein the sugar is sucrose.

4. The method of claim 1 wherein the water comprises an alkalinity content of not more than 20 ppm and the sugar added is high fructose corn syrup composed of a brix in the range of 76.5–77.4.

5. The method of claim 4 wherein the beverage comprises a brix content in the range of 10.5–10.8 and the volumetric ratio of the quantity of sugar added per quantity of concentrate is about 1.33–1.67.

6. The method of claim 4 wherein the beverage comprises a brix content in the range of 10.0–10.4 and the volumetric ratio of the quantity of sugar added per quantity of concentrate is about 3.5.

7. The method of claim 4 wherein the beverage comprises a brix content in the range of 10.4–10.8 and the volumetric ratio of the quantity of sugar added per quantity of concentrate is about 0.67–1.5.

8. The method of claim 4 wherein the beverage comprises a brix content in the range of 11.1–11.5 and the volumetric ratio of the quantity of sugar added per quantity of concentrate is about 0.6–1.

9. The method of claim 4 wherein the beverage comprises a brix content in the range of 11.5–11.9 and the volumetric ratio of the quantity of sugar added per quantity of concentrate is about 1.25.

10. The method of claim 4 wherein the beverage comprises a brix content in the range of 11.4–12.4 and the volumetric ratio of the quantity of sugar added per quantity of concentrate is about 0.4–0.8.

11. The method of claim 4 wherein the beverage comprises a brix content in the range of 12.6–13.0 and the volumetric ratio of the quantity of sugar added per quantity of concentrate is about 1.25.

12. The method of claim 4 wherein the beverage comprises a brix content in the range of 13.6–14.0 and the volumetric ratio of the quantity of sugar added per quantity of concentrate is about 0.875.

13. The method of claim 4 wherein the beverage comprises a brix content in the range of 12.4–12.8 and the volumetric ratio of the quantity of sugar added per quantity of concentrate is selected from the group consisting of the ranges of 0.47–0.53 and the range of 0.5–1.

14. The method of claim 4 wherein the beverage comprises a brix content in the range of 10.4–10.8 and the volumetric ratio of the quantity of sugar added per quantity of concentrate is selected from the group consisting of the ranges of 2.67–4 and 4.67–7.

15. The method of claim 4 wherein the beverage comprises a brix content in the range of 10.6–11.0 and the volumetric ratio of the quantity of sugar added per quantity of concentrate is about 0.875.

16. A method of proportioning a beverage, comprising the steps of:
   A. Providing a flow of finished syrup comprising water, sugar and concentrate;
   B. providing a flow of water;
   C. determining the sugar concentration of the finished syrup;
   D. mixing the water and the finished syrup wherein the proportion of the water to be mixed with the finished syrup is determined as a function of the sugar concentration of the finished syrup as compared to a plurality of preset parameters of the beverage.
   E. before mixing the water and syrup in step D, adding sugar to the finished syrup to reduce said acidity;
   F. the water comprises an alkalinity content of not more than 20 ppm.

17. The method of claim 16 wherein the sugar added is high fructose corn syrup composed of a brix in the range of 76.5–77.4.

18. The method of claim 16 wherein the preset beverage parameters comprise a brix range of 10.4–10.8 and a total acidity (TA) range of 17.3–19.0 and said water flow is determined according to the following formula:

$$\text{WATER FLOW} = 1.2391 \cdot \text{FS} - 39.4913$$

where FS is the brix of the finished syrup.

19. The method of claim 16 wherein the preset beverage parameters comprise a brix range of 10.0–10.4 and a total acidity (TA) range of 24.5–26.5 and said water flow is determined according to the following formula:

$$\text{WATER FLOW} = 1.1961 \cdot \text{FS} - 35.7452$$

where FS is the brix of the finished syrup.

20. The method of claim 16 wherein the preset beverage parameters comprise a brix range of 10.4–10.8 and a total acidity (TA) range of 8.5–9.5 and said water flow is determined according to the following formula:

$$\text{WATER FLOW} = 1.0799 \cdot \text{FS} - 31.4123$$

where FS is the brix of the finished syrup.

21. The method of claim 16 wherein the preset beverage parameters comprise a brix range of 11.1–11.5 and a total acidity (TA) range of 11.5–13.5 and said water flow is determined according to the following formula:

$$\text{WATER FLOW} = 1.2572 \cdot \text{FS} - 44.1736$$

where FS is the brix of the finished syrup.

22. The method of claim 16 wherein the preset beverage parameters comprise a brix range of 11.5–11.9 and a total acidity (TA) range of 5.3–6.9 and said water flow is determined according to the following formula:

$$\text{WATER FLOW} = 0.8926 \cdot \text{FS} - 25.6971$$

where FS is the brix of the finished syrup.

23. The method of claim 16 wherein the preset beverage parameters comprise a brix range of 11.4–12.4 and a total acidity (TA) range of 28.2–32.2 and said water flow is determined according to the following formula:

$$\text{WATER FLOW} = 1.6082 \cdot \text{FS} - 68.2669$$

where FS is the brix of the finished syrup.

24. The method of claim 16 wherein the preset beverage parameters comprise a brix range of 12.6–13.0 and a total acidity (TA) range of 5.8–7.4 and said water flow is determined according to the following formula:

$$\text{WATER FLOW} = 0.9643 \cdot \text{FS} - 34.6405$$

where FS is the brix of the finished syrup.

25. The method of claim 16 wherein the preset beverage parameters comprise a brix range of 13.6–14.0 and a total acidity (TA) range of 36.8–39.4 and said water flow is determined according to the following formula:

$$\text{WATER FLOW} = 1.0286 \cdot \text{FS} - 39.9543$$

where FS is the brix of the finished syrup.

26. The method of claim 16 wherein the preset beverage parameters comprise a brix range of 12.4–12.8 and a total acidity (TA) range of 20.0–23.0 and said water flow is determined according to the following formula:

$$\text{WATER FLOW} = 0.9233 \cdot \text{FS} - 29.5115$$

where FS is the brix of the finished syrup.

27. The method of claim 16 wherein the preset beverage parameters comprise a brix range of 10.4–10.8 and a total acidity (TA) range of 19.3–21.0 and said water flow is determined according to the following formula:

$$\text{WATER FLOW} = 1.239 \cdot \text{FS} - 39.4913$$

where FS is the brix of the finished syrup.

28. The method of claim 16 wherein the preset beverage parameters comprise a brix range of 10.6–11.0 and a total acidity (TA) range of 26.3–28.5 and said water flow is determined according to the following formula:

$$\text{WATER FLOW} = 0.8813 \cdot \text{FS} - 21.9429$$

where FS is the brix of the finished syrup.

* * * * *